(No Model.)

G. F. FOLSOM.
SHUTTER FASTENER.

No. 395,557. Patented Jan. 1, 1889.

WITNESSES:
C. E. Hamill
Sidney W. Winslow

INVENTOR:
Geo. F. Folsom.
By C. B. Tuttle
Atty.

UNITED STATES PATENT OFFICE.

GEORGE F. FOLSOM, OF BOSTON, MASSACHUSETTS.

SHUTTER-FASTENER.

SPECIFICATION forming part of Letters Patent No. 395,557, dated January 1, 1889.

Application filed September 17, 1888. Serial No. 285,626. (No model.)

*To all whom it may concern:*

Be it known that I, GEORGE F. FOLSOM, of Boston, in the county of Suffolk and Commonwealth of Massachusetts, have invented certain Improvements in Shutter-Fasteners, of which the following, taken in connection with the accompanying drawings, is a specification.

Figure 1:
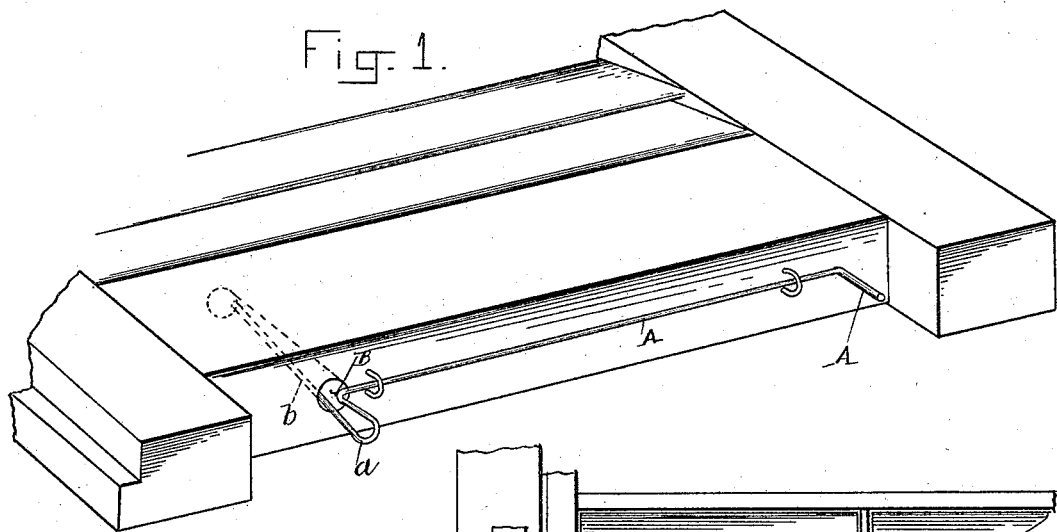
Figure 2:
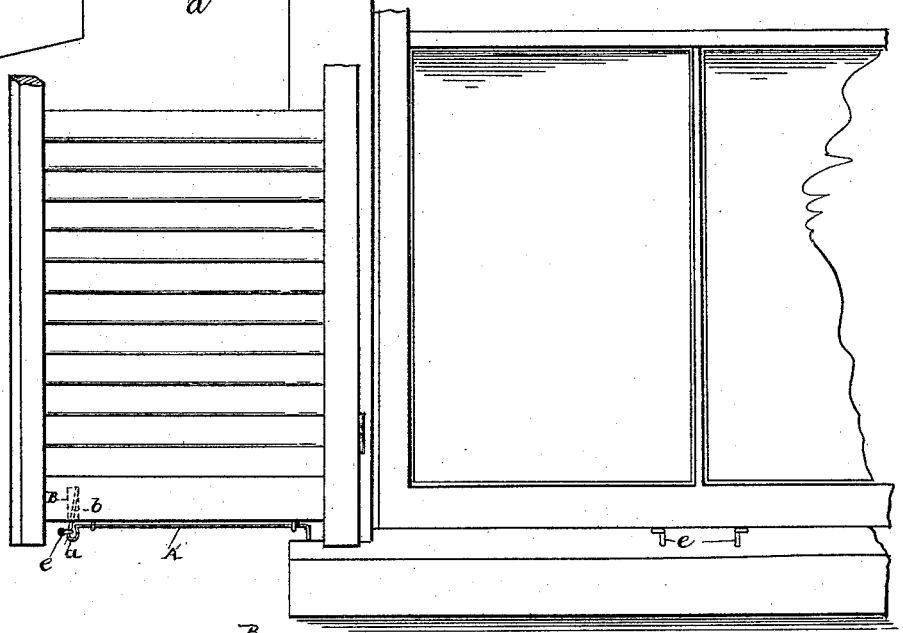
Figure 3:
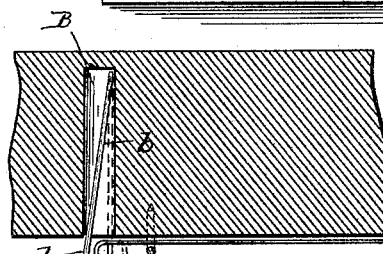

In the accompanying drawings, Figure 1 is a perspective view of my improved shutter-fastener. Fig. 2 is a side elevation representing a portion of a window-sill, a shutter, and my improved shutter-fastener combined. Fig. 3 is a sectional detail, to be referred to hereinafter.

The shutter-fastener is preferably formed of wire, having a main arm, A, downwardly-extending loop $a$, and an upward extension or arm, $b$, all substantially as shown in Fig. 1.

The shutter-frame is provided with a recess, B, (see Fig. 3,) and, in combination, the arm $b$ of said fastener is located in said recess, with its top end bearing against the shutter, as shown in Fig. 3. The arm A of the fastener is extended along the bottom edge of the shutter, with its rear end extended to a point in close proximity to the axial side of the shutter. The fastener is supported by suitable staples which surround the arm A and enter the frame-work of the shutter, as shown. The loop $a$ of the fastener extends downwardly from the shutter-frame, as represented, so as to engage in a suitably-notched bar fixed in the outer wall, for holding the shutter open, and with a similar device, $e$, fixed in the window-sill, for holding the shutter closed. The rear end of the arm A is curved, so as to form a ready means whereby to manipulate the fastener. The normal position of the fastener is represented in Fig. 3. From this position it may be drawn backward to the position represented in Fig. 3 by dotted lines. The fastener is in its normal position whenever the extension-loop $a$ is engaged with the catch-bolts $e$, and the backward movement of said fastener into position occupied by said dotted lines operates to disengage the extension $a$ from the catch-bar and releases the shutter. Said backward movement for releasing the shutter is effected by pressing backwardly against the upturned rear end of the fastener, and the pressure thus applied is resisted by the extension-arm $b$ of the fastener bearing its end against the shutter-frame. The rearward movement of the fastener forces an expansion of the curved extension $a$, and is compensated for by the springing qualities of the fastener material. The fastener is returned to its normal position by the resultant contraction of said curved extension, which takes place automatically whenever the withdrawing force is removed. The rear end of the fastener is extended and terminated at a point near the axial side of the shutter, which is the most accessible point for the operator to manipulate the fastener when the shutter is open.

I would not be understood as limiting my invention to a fastener having the exact curvilinear formation herein represented, as instead of the looped extension $a$ other obvious curvatures might be employed.

I claim and desire by Letters Patent to secure—

1. A shutter-fastener consisting of an operating-arm, A, a loop, $a$, adapted to engage with a locking-catch in the open and closed positions of the shutter, and a spring-extension for one end of the loop $a$, for holding said loop normally in a position to engage with the holding-catches, substantially as described.

2. In combination, an operating-arm, A, held to the bottom of a shutter, a depending loop, $a$, having a spring-extension, $b$, with its bearings in a recess in the shutter, and holding-catches on the outer wall and window-sill in line with the loop $a$, substantially as described.

Signed at Boston, Massachusetts, this 14th day of September, 1888.

GEO. F. FOLSOM.

Witnesses:
JOHN H. HILLER,
C. B. TUTTLE.